March 17, 1936. O. V. MARTIN 2,034,682
PREPARATION OF METALLIC CHLORIDES
Filed Aug. 16, 1932
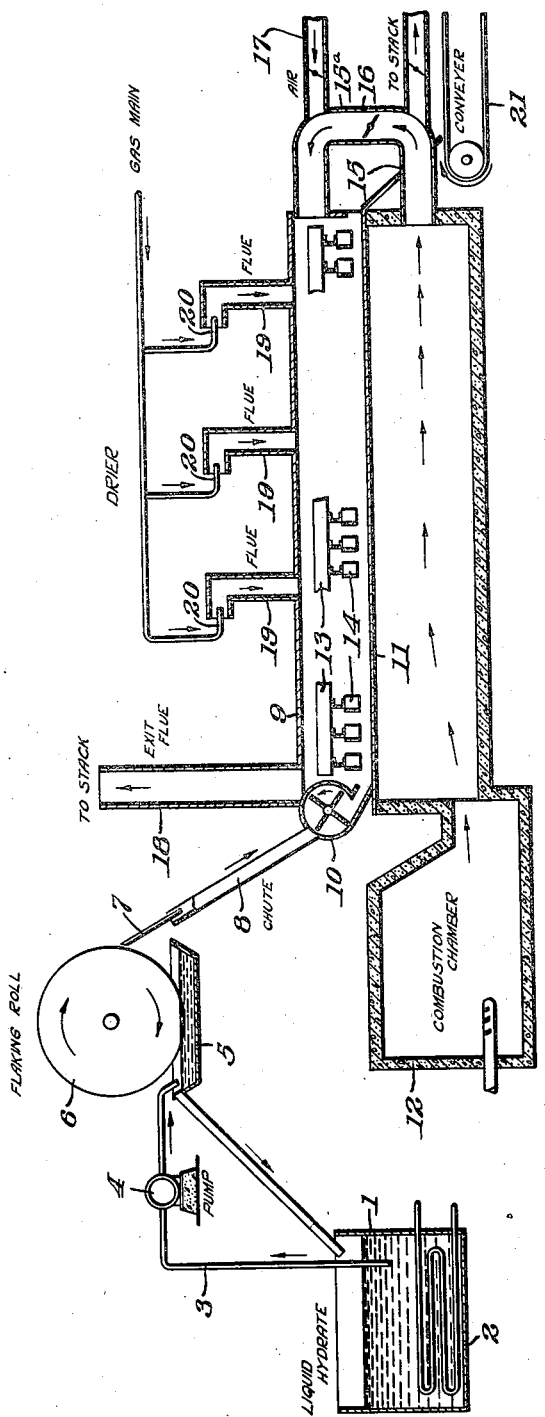
OTTO V. MARTIN
INVENTOR
BY R. J. Dearborn
HIS ATTORNEY Patented Mar. 17, 1936

2,034,682

UNITED STATES PATENT OFFICE 2,034,682

PREPARATION OF METALLIC CHLORIDES

Otto V. Martin, Tulsa, Okla., assignor to Texaco Salt Products Company, New York, N. Y., a corporation of Delaware Application August 16, 1932, Serial No. 628,973

1 Claim. (Cl. 34—24)

This invention relates to the preparation of metallic chlorides and more particularly to a method of preparing calcium chloride in the form of hydrated particles which have been either partially or substantially completely dehydrated.

The invention comprises an improved method of and apparatus for preparing calcium chloride and the like wherein the salt is prepared in the form of flakes or particles of hydrate, and the resulting flakes or particles then subjected to slow uniform drying under moderate conditions of temperature whereby water of hydration is gradually removed without distortion of the particles. The drying is advantageously effected by exposing the particles to the action of a stream of drying gas flowing thereover, and which is diluted with relatively fresh streams of gas to maintain a uniformly low concentration of absorbed moisture in the body of drying gas as it advances over the flaked material.

The present application is a continuation-in-part of my Patent No. 1,877,733, patented September 13, 1932 for "Anhydrous metallic chlorides and their preparation."

In practicing my invention, the calcium chloride may be prepared by recovery from a natural brine such as an oil field brine or from any other solution which contains the salt. The brine or salt solution may be treated with chemicals and preliminarily concentrated to remove impurities and other compounds. The remaining solution composed substantially entirely of calcium chloride is then further concentrated by heating in any suitable manner until the concentration reaches about 71% to 75% of calcium chloride.

The resulting concentrated liquid comprising substantially a fused fluid mass of hydrate is then converted into the form of particles or solid flakes by cooling and mechanical means.

The resulting flakes containing about 25% to 30% of water are then slowly passed through an enclosed hearth. The hearth is advantageously heated by external means while a stream of warm unsaturated air or drying gas is passed through the hearth over the flaked material. The drying gas preferably flows countercurrently to the flaked material and is diluted at successive intervals by mingling therewith streams of relatively fresh unsaturated gas. The purpose of this repeated dilution is to dissipate or reduce the concentration of absorbed moisture contained in the drying gas as it advances over the flaked material.

In this way, the body of drying gas is maintained in a uniform condition and, at the same time, there is also maintained a uniformly wide differential between the partial pressure of water in the gas and that in the immediate vicinity of, or at the surfaces of, the particles or flakes. Maintaining a uniformly wide differential in this respect not only effects gradual removal of the water from the particles but also serves to facilitate its removal at temperatures much lower than would otherwise be required, for example, if external heating of the hearth only were used. In fact, under these conditions substantially all of the water of hydration may be removed without heating the particles to a temperature of more than about 200° F. It is essential that external heating of the hearth be confined to a minimum in order to avoid overheating of the particles or flakes coming in contact with the hot surface, and which would result in melting or softening of the material.

In order to more clearly understand the invention, reference will now be made to the accompanying drawing forming a part of the specification.

The calcium chloride solution is concentrated up to 71% to 75% concentration and maintained in a tank 1 provided with a heating coil 2, by which means sufficient heat is supplied to maintain the hydrate in a liquid condition at a temperature of around 350° F. The liquid is withdrawn from the tank through pipe 3 by a pump 4 and delivered to a pan 5.

The pan 5 forms part of the flaking apparatus such as described, for example, in my patent identified above. An internally-cooled roll or drum 6 dips into the surface of the body of liquid maintained in the pan 5. As the roll rotates, a film of hydrate forms on the surface of the roll and is ultimately removed therefrom by means of a scraper 7 which removes the solid film in the form of flakes.

The resulting flakes fall onto a chute 8 and are conducted to the inlet end of the drier or dehydrator 9. The flakes are fed into the drier by an automatic feed mechanism 10.

The dehydrator 9 comprises a comparatively long, enclosed hearth, the floor 11 of which forms the hearth proper. The hearth is supported upon a masonry setting which latter communicates with a combustion chamber or furnace 12.

Within the hearth chamber is supported a rake 13 provided with rabbles 14 adapted to move the particles over the floor of the hearth in short strokes and, at the same time, subject them to stirring and agitation as they are moved over the floor of the hearth in order to constantly re-expose the surfaces of the particles to the drying gas flowing thereover. The rake 13 may be substantially similar in design and operation to that described in detail, for example, in my co-pending Patent No. 1,877,733 referred to above.

The automatic feed mechanism 10, previously referred to, may be connected to the rake 13 by a ratchet and pawl means not shown, so as to feed a quantity of the flakes into the dehydrator during each forward motion of the rake. The feed mechanism 10 serves to prevent the escape of the drying gas from the dehydrator at this point.

The furnace 12 provides a means for supplying hot gaseous products of combustion to the furnace setting, which gases, as they flow therethrough, serve to heat the bottom of the hearth.

This flue gas is removed from the discharge end of the furnace setting through a flue 15 which communicates through a branch 15a with the upper and enclosed portion of the hearth. The flue 15a is provided with a damper or valve 16, and also an auxiliary inlet 17 through which other gas or air, for example, may be introduced to the hearth.

The warm and relatively unsaturated gaseous products of combustion then flow through the enclosed hearth towards the end at which the flaked material is entering, and is removed therefrom through an exit flue 18. While not shown in the drawing, a fan may be provided to communicate with the exit flue 18 for the purpose of creating a forced draft through the hearth.

A series of flues 19 are provided for introducing fresh gas to the hearth chamber. These flues are spaced at short intervals throughout the length of the hearth. The upper open ends of these flues are adapted to receive gas burners 20 by which means combustion may be maintained at the inlet or opening of each flue. In this way, streams of hot flue gases, diluted with any desired quantity of air, may be passed downwardly through the flues and introduced to the hearth chamber. These streams of relatively unsaturated gas, entering through the flues, mingle with the main body of drying gas flowing over the floor of the hearth and serve to dilute it and thereby maintain the concentration of absorbed moisture at a substantially constant and low value as the body of gas advances over or through the flaked material being dried in the hearth.

The dried or dehydrated flaked material is discharged from the outlet end of the hearth onto a conveyor 21 by which means it is conducted to suitable means for screening and packaging.

By means of the apparatus of my invention, it is possible to very closely regulate the conditions under which the drying or dehydration of the material is carried out. Temperature conditions of the mass of particles or flakes passing through the hearth may be readily controlled by adjusting the quantity of drying gas entering the hearth from the combustion chamber 12. In turn, the temperature or degree of saturation of this gas may be modified by diluting it with fresh gas of any desired condition of temperature or saturation, introduced either through the inlet 17 or the flues 19.

By means of the latter, it is possible to introduce to the hearth streams of gas which may be warm or moderately hot, depending upon the amount of excess air which may be admitted to the flues around the burners 20.

While the apparatus of my invention is particularly well adapted to the drying of particles or flakes of the metallic chlorides, such as calcium or magnesium chloride, it is also suitable for the drying of various other types of material.

Obviously many modifications and variations of the invention, as hereinbefore set forth, may be made without departing from the spirit and scope thereof, and therefore only such limitations should be imposed as are indicated in the appended claim.

I claim:

The method of removing water from hydrated calcium chloride in particle form containing about 25% to 30% water which comprises passing the particles of hydrated material through an enclosed hearth, externally heating the hearth with hot gases of combustion, then passing regulatable quantities of these gases through the hearth countercurrently to the particles and in direct contact therewith, and introducing to the hearth at successive points freshly formed streams of gases of combustion to mingle with the first mentioned stream of gas flowing thereover to maintain a uniformly low concentration of absorbed moisture in the body of gas as it advances over the particles whereby water is gradually removed without distortion of the particles.

OTTO V. MARTIN.